(12) United States Patent
He

(10) Patent No.: US 10,509,868 B2
(45) Date of Patent: Dec. 17, 2019

(54) OPERATING A SOLAR POWER GENERATING SYSTEM

(71) Applicant: FUJITSU LIMITED, Kawasaki-shi, Kanagawa (JP)

(72) Inventor: Dawei He, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 623 days.

(21) Appl. No.: 15/011,078

(22) Filed: Jan. 29, 2016

(65) Prior Publication Data

US 2017/0220708 A1 Aug. 3, 2017

(51) Int. Cl.
| G06F 17/50 | (2006.01) |
| H02J 3/38 | (2006.01) |
| G01W 1/10 | (2006.01) |
| G01W 1/12 | (2006.01) |

(52) U.S. Cl.
CPC .......... G06F 17/5009 (2013.01); G01W 1/10 (2013.01); G01W 1/12 (2013.01); H02J 3/383 (2013.01); G06F 2217/78 (2013.01); Y02E 60/76 (2013.01); Y04S 40/22 (2013.01)

(58) Field of Classification Search
CPC .... G06F 17/5009; G06F 17/504; G06F 17/50; G06F 2217/10; H02S 50/10; G05B 15/02; H02J 3/38; H02J 3/003; G06N 7/00
See application file for complete search history.

(56) References Cited

PUBLICATIONS

Lorenz, Elke, et al. "Irradiance forecasting for the power prediction of grid-connected photovoltaic systems." IEEE Journal of selected topics in applied earth observations and remote sensing 2.1 (2009): 2-10.*

Lo, Chun-Hao, and Nirwan Ansari. "Alleviating solar energy congestion in the distribution grid via smart metering communications." IEEE Transactions on Parallel and Distributed Systems 23.9 (2012): 1607-1620.*

Bertsimas, Dimitris, David B. Brown, and Constantine Caramanis. "Theory and applications of robust optimization." SIAM review 53.3 (2011): 464-501.*

Sevlian, Raffi, and Ram Rajagopal. "Short term electricity load forecasting on varying levels of aggregation." arXiv preprint arXiv: 1404.0058 (2014).*

(Continued)

*Primary Examiner* — Omar F Fernandez Rivas
*Assistant Examiner* — Joshua E. Jensen
(74) *Attorney, Agent, or Firm* — Maschoff Brennan

(57) ABSTRACT

A method may include obtaining historical irradiance data for each of a first and second locations, each of the first and the second locations including first and second solar power generating devices respectively, and forecasting irradiance at the first and the second locations as a first and a second forecast respectively. The method may also include determining a first and a second confidence interval of the first and the second forecasts respectively, the first and the second confidence interval based on the first historical irradiance data and the first forecast and the second historical irradiance data and the second forecast respectively, and modeling covariance between the first and the second confidence intervals. Based on the modeled covariance, the method may include developing an aggregated forecast of irradiance, and sending a message to a device to modify power generation.

20 Claims, 8 Drawing Sheets

(56) References Cited

PUBLICATIONS

Taieb, Souhaib Ben, et al. Probabilistic time series forecasting with boosted additive models: an application to smart meter data. No. 12/15. Monash University, Department of Econometrics and Business Statistics, 2015.*

Lombardi, P., M. Powalko, and K. Rudion. "Optimal operation of a virtual power plant." Power & Energy Society General Meeting, 2009. PES'09. IEEE. IEEE, 2009.*

Mohammed, Azhar Ahmed, Waheeb Yaqub, and Zeyar Aung. "Probabilistic forecasting of solar power: An ensemble learning approach." Intelligent Decision Technologies. Springer, Cham, 2015. 449-458.*

Zapata, J., Jeroen Vandewalle, and William D'haeseleer. "A comparative study of imbalance reduction strategies for virtual power plant operation." Applied Thermal Engineering 71.2 (2014): 847-857.*

Lorenz, Elke, et al. "Irradiance forecasting for the power prediction of grid-connected photovoltaic systems." IEEE Journal of selected topics in applied earth observations and remote sensing 2.1 (2009): 2-10. (Year: 2009).*

Lo, Chun-Hao, and Nirwan Ansari. "Alleviating solar energy congestion in the distribution grid via smart metering communications." IEEE Transactions on Parallel and Distributed Systems 23.9 (2012): 1607-1620. (Year: 2012).*

Bertsimas, Dimitris, David B. Brown, and Constantine Caramanis. "Theory and applications of robust optimization." SIAM review 53.3 (2011): 464-501. (Year: 2011).*

Sevlian, Raffi, and Ram Rajagopal. "Short term electricity load forecasting on varying levels of aggregation." arXiv preprint arXiv:1404.0058 (2014). (Year: 2014).*

Taieb, Souhaib Ben, et al. Probabilistic time series forecasting with boosted additive models: an application to smart meter data. No. 12/15. Monash University, Department of Econometrics and Business Statistics, 2015. (Year: 2015).*

Lombardi, P., M. Powalko, and K. Rudion. "Optimal operation of a virtual power plant." Power & Energy Society General Meeting, 2009. PES'09. IEEE. IEEE, 2009 (Year: 2009).*

Mohammed, Azhar Ahmed, Waheeb Yaqub, and Zeyar Aung. "Probabilistic forecasting of solar power: An ensemble learning approach." Intelligent Decision Technologies. Springer, Cham, 2015. 449-458. (Year: 2015).*

Zapata, J., Jeroen Vandewalle, and William D'haeseleer. "A comparative study of imbalance reduction strategies for virtual power plant operation." Applied Thermal Engineering 71.2 (2014): 847-857. (Year: 2014).*

Shi, L., Y. Luo, and G. Y. Tu. "Bidding strategy of microgrid with consideration of uncertainty for participating in power market." International Journal of Electrical Power & Energy Systems 59 (2014): 1-13. (Year: 2014).*

Peng, Zhenzhou, et al. "Solar irradiance forecast system based on geostationary satellite." 2013 IEEE International Conference on Smart Grid Communications (SmartGridComm). IEEE, 2013. (Year: 2013).*

Yang, Dazhi, Panida Jirutitijaroen, and Wilfred M. Walsh. "Hourly solar irradiance time series forecasting using cloud cover index." Solar Energy 86.12 (2012): 3531-3543. (Year: 2012).*

"GEFCom2014 Probabilistic Solar Power Forecasting based on k-Nearest Neighbor and Kernel Density Estimator," PESGM, 2015, Zhang et al.

"A Bayesian Method for Short-Term Probabilistic Forecasting of Photovoltaic Generation in Smart Grid Operation and Control," 6, 733-747 Energies 2013, Bracale et al.

"Probabilistic Forecasting of Solar Power: An Ensemble Learning Approach," Intelligent Decision Technologies, pp. 449-458, vol. 39 of the series Smart Innovation, Systems and Technologies, 2015, Mohammed et al.

"PV Power Output Variability: Correlation Coefficients", Clean Power Research, 2010, Hoff et al.

"Implications of Wide-Area Geographic Diversity for Short-Term Variability of Solar Power", LBNL Report, Environmental Energy Technologies Division, 2010, Mills et al.

"Analysis of Variability and Uncertainty in Wind Power Forecasting: An international Comparison." NREL Report, 2013, Zhang et al.

"Short Term Electricity Load Forecasting on Varying Levels of Aggregation," Power System, IEEE Transactions on, 2013, Sevlian et al.

"A quantile regression algorithms for forecasting uncertainty in electricity smart meter data," The Economic Value of Macroeconomic Forecasts with Big Data, Warwick, UK, 2015, Taieb et al.

"Distributionally Robust Optimization and its Tractable Approximations," NUS Business School, Working Paper, 2009, Joel Goh and Melvyn Sim.

* cited by examiner

OPERATING A SOLAR POWER GENERATING SYSTEM

FIELD

One or more embodiments discussed in the present disclosure relate to operating a solar power generating system.

BACKGROUND

There are many efforts throughout the world to reduce greenhouse emissions. Efforts may range from hybrid vehicles to energy efficient light bulbs. One avenue of efforts is associated with the generation of electrical power and greenhouse emissions associated with various types of electrical power generation. One source of electrical power that has received attention is solar power because it is renewable and does not burn fossil fuels. However, the effectiveness of solar power generation can be greatly affected by weather experienced at a location generating solar power.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a non-transitory computer readable medium that includes computer readable instructions stored thereon that are executable by one or more processors to perform or control performance of operations. The operations may include obtaining historical irradiance data for a first location and second historical irradiance data for a second location, the first location including a first solar power generating device and the second location including a second solar power generating device. The operations may also include forecasting irradiance at the first location as a first forecast and at the second location as a second forecast. The operations may additionally include determining a first confidence interval of the first forecast and a second confidence interval of the second forecast, the first confidence interval based on the first historical irradiance data and the first forecast, the second confidence interval based on the second historical irradiance data and the second forecast. The operations may further include modeling covariance between the first confidence interval and the second confidence interval. Based on the modeled covariance, the operations may also include developing an aggregated forecast of irradiance aggregating forecasted irradiance at the first location and forecasted irradiance at the second location, and, based on the aggregated forecast, sending a message to a non-solar power generating device to modify power generation proportional to the aggregated forecast.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Solar power is a source of electrical power that is dependent on the amount of sunlight to which a photovoltaic cell is exposed. For this reason, electricity producers, such as managers and operators of virtual power plants (VPP) utilize forecasts of irradiance (e.g., the flux of radiant energy per unit area) to predict the amount of electricity that a solar power producing device may generate. However, such forecasts are not always accurate, and may not account for an expected variability of the forecast. Furthermore, these problems may be exacerbated when multiple locales of solar power generating devices are involved.

The present disclosure may relate to operating a solar power generating system by utilizing information indicative of the accuracy of a forecast of irradiance across multiple locations. A test dataset of historical irradiance may be obtained, for example, the irradiance experienced by each location for a number of days in various seasons and various weather conditions. The test datasets may be normalized based on a clear sky model of irradiance, for example, by dividing the irradiance at a point in time in the test dataset with the clear sky irradiance for that time of day. After being normalized, the test dataset may be clustered into weather classes (e.g. clear sky, partly cloudy, or overcast) with a set of associated characteristics. Such actions may create a framework for analyzing the accuracy of a forecast for each location. A forecast of irradiance to be analyzed within the framework may be obtained, for example, from a third party predictive service. The forecast may then be classified into one of the weather classes. Based on the characteristics of the weather class, confidence intervals for the forecast may be determined. The confidence intervals may indicate the reliability of the forecast. The covariance between the confidence intervals of the multiple locations may then be modeled. Based on the modeled covariance, an aggregated forecast of irradiance and/or an aggregated confidence interval across the multiple locations may be determined. In some embodiments, the operation of a power plant or other non-solar power generating device may be modified based on the aggregated forecast or the aggregated confidence interval.

Embodiments of the present disclosure are explained with reference to the accompanying drawings.

Figure 1:
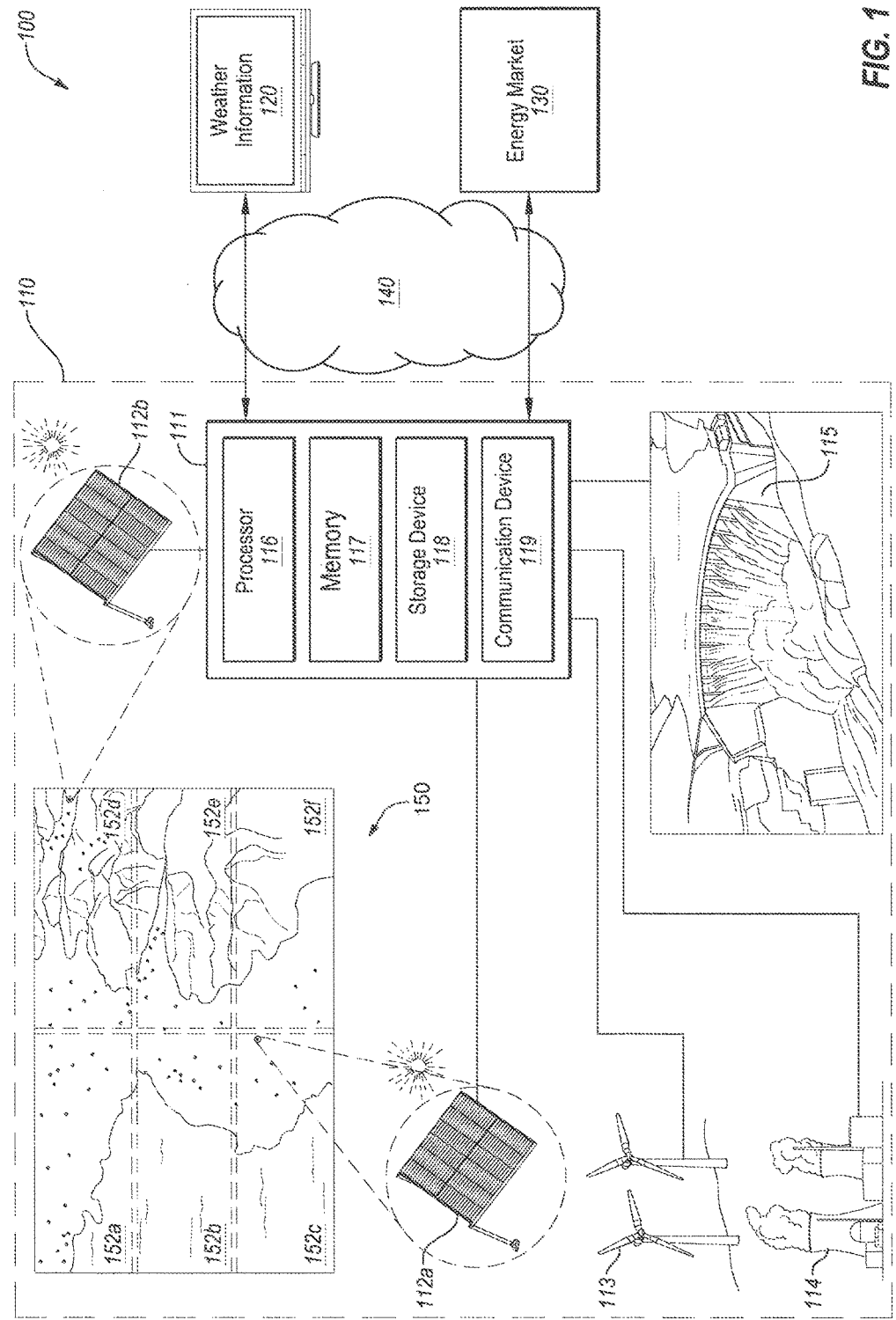
FIG. 1 is a diagram representing an example system configured to operate a virtual power plant including a solar power generating device.

FIG. 1 is a diagram representing an example system 100 configured to operate a virtual power plant (VPP) 110 including solar power generating devices 112 (such as solar power generating device 112*a* and 112*b*). The system 100 may include the VPP 110, a weather information source 120, an energy market 130, and a network 140. The VPP 110 may include a control device 111 and one or more sources of generating electrical power. For example, as illustrated in FIG. 1, the VPP 110 may include the solar power generating devices 112a and 112b, a wind power generating device 113, a fossil fuel power generating device 114, and a hydro power generating device 115.

The control device 111 may include any device, system, component, or collection of components configured to manage the operation of the VPP 110. For example, the control device 111 may generate or analyze forecasts associated with solar power generation at the solar power generating devices 112. As another example, the control device 111 may regulate or modify the amount of power being generated by one or more of the sources that generate electrical power. The control device 111 may also perform an analysis on weather information, such as weather information received from the weather information source 120.

The weather information source 120 may be any device, system, component, or collection of components configured to store, generate, predict, or otherwise handle weather information. Weather information at the weather information source 120 may include any weather information, including, for example, irradiance, cloud cover, cloud formation, cloud class, sky cover (e.g., the percentage of the sky covered with clouds), hours of sun shine, season (e.g., winter, summer), daily maximum temperature, daily minimum temperature, dew point temperature, temperature, relative humidity, wind speed, wind direction, daily probability of precipitation, solar azimuth angle, solar zenith angle, normalized hour angle, etc.

Weather information at the weather information source 120 may be available from any source, such as an almanac, a weather forecasting service, a news station, a database of physical observations, a web service, etc. In some embodiments, the weather information may be characterized as a data triad of a time (which may include any of the day, hour, minute, or second), a location, and associated data. For example, a data triad may include Jul. 4, 2015 at 10 AM at San Francisco, Calif. and may have corresponding weather information such as daily high of eighty-five degrees, ten percent sky cover, summer, and ten percent chance of rain. The weather information source 120 may include historical data for a variety of locations, such as the location of the solar power generating devices 112. The weather information source 120 may also include forecasts, projections, or other forward looking information regarding weather. In some embodiments, weather information such as historical data or forecasts of weather information may be communicated from the weather information source 120 to the control device 111 via the network 140. In some embodiments, the control device 111 may generate a forecast of weather information.

The energy market 130 may be any system or collection of systems where electrical power may be purchased or sold. For example, the control device 111 may provide some portion of the electrical power generated at the VPP 110 to the energy market 130. Additionally or alternatively, the control device 111 may acquire or purchase additional energy from the energy market 130 for distribution to one or more subscribers that receive electrical power from the VPP 110. In some embodiments, electrical power may be reserved or otherwise provisionally purchased via the energy market 130.

The network 140 may include any device, system, component, or combination thereof configured to provide communication between one or more of the control device 111, the weather information source 120, and the energy market 130. The communication may include not only informational communication, but may also include other types of communication, for example, communication of electrical power. By way of example, the network 140 may include one or more wide area networks (WANs), local area networks (LANs), electrical distribution networks, power-line networks, etc., that enable the control device 111, the weather information source 120, and/or the energy market 130 to be in communication. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth® access points, wireless access points, IP-based networks, or the like. The network 140 may also include servers, substations, or other connection devices that enable one type of network to interface with another type of network. Additionally or alternatively, the network 140 may include an Intranet, or one or more computing devices in communication within an organization or an in otherwise secure manner.

In some embodiments, the solar power generating device 112a, 112b, the wind power generating device 113, the fossil fuel power generating device 114, and/or the hydro power generating device 115 may be in communication with the control device 111 via the network 140. Additionally or alternatively, the solar power generating devices 112a, 112b, the wind power generating device 113, the fossil fuel power generating device 114, and/or the hydro power generating device 115 may be electrically in communication with a system for storing, distributing, selling, conditioning, or otherwise handling or controlling the generated power. In these and other embodiments, the control device 111 may be part of and/or may direct or control such a system.

In some embodiments, the solar power generating devices 112 may be distributed across multiple locations. For example, a map 150 may illustrate a first through a sixth region 152a-152f designated by double-dashed lines. As illustrated in the map 150, the solar power generating devices 112 may be depicted as dots in the first through sixth regions 152a-152f. In these and other embodiments, the solar power generating devices 112 may be consumer solar power generating devices (e.g., solar panels on a home), commercial solar power generating devices (e.g., a solar power field, or businesses with solar panels), etc. The solar power generating devices 112 may be distributed in a certain density. For example, the first region 152a may have a first density of solar power generating devices that is denser than the sixth region 152f. In these and other embodiments, separate analysis and/or consideration may be made for each of the first through sixth regions 152a-152f.

In operation, the control device 111 may perform any of the operations described in the present disclosure. For example, the control device 111 may obtain a test dataset of historical weather information regarding the location of the solar power generating device 112a from the weather information source 120 via the network 140. The weather information of the test dataset may include historical irradiance data. The control device 111 may use the historical irradiance data and a clear sky model of irradiance to normalize the historical irradiance data. For example, for a data point in the test dataset corresponding to a given time of day, the historical irradiance data for the data point may be divided by the clear sky irradiance for that time of day. After being normalized, the test dataset may be independent of the time of day or independent of the solar zenith angle. The normalized value may be referred to as the clear sky index.

Based on the normalized irradiance data (e.g., the clear sky indexes of the test dataset), the test dataset may be clustered into weather classes. Some examples of weather classes may include clear, overcast, or partly cloudy. Each class may have a corresponding set of characteristics, which may include any of the weather information described as being at the weather information source 120. For example, the weather class of clear may have high irradiance and high daily temperature and low daily precipitation chances. The set of characteristics may also include a degree of unpredictability of irradiance. For example, an overcast or partly cloudy weather class may have a higher degree of unpredictability of irradiance than a clear class. One example of clustering the test dataset into weather classes may be illustrated and described with reference to FIG. 2. In some embodiments, the test dataset may also be clustered based on a solar zenith angle (e.g. low solar zenith angle for up to approximately two hours after sunrise and up to approximately two hours before sunset, and a high solar zenith angle for approximately two hours after sunrise until approximately two hours before sunset). While two hours is used as an example, it will be appreciated that this value may also change depending on a variety of factors, including elevation, surrounding mountains or other terrain, or other factors that may increase or decrease the amount of solar energy production. For example, the approximate time may also include a half of an hour, one hour, or an hour and a half. In these and other embodiments, the clustering based on solar zenith angle may be a sub-class within the weather class. For example, data points within the morning hours of the test dataset may be clustered in one sub-class and data points within the evening hours of the test dataset may be clustered in another sub-class. For example, during times of low solar zenith angle, ground obstacles (e.g., trees) may create an increase in variability when compared to data points with a high solar zenith angle. In addition to ground obstacles, geographic location may also effect the variability of the low solar zenith angle sub-classes. For example, in California, marine layer clouds in the mornings may cover much of the sky while in the evening, marine clouds may have dissipated to a larger extent than the morning hours.

Figure 2:
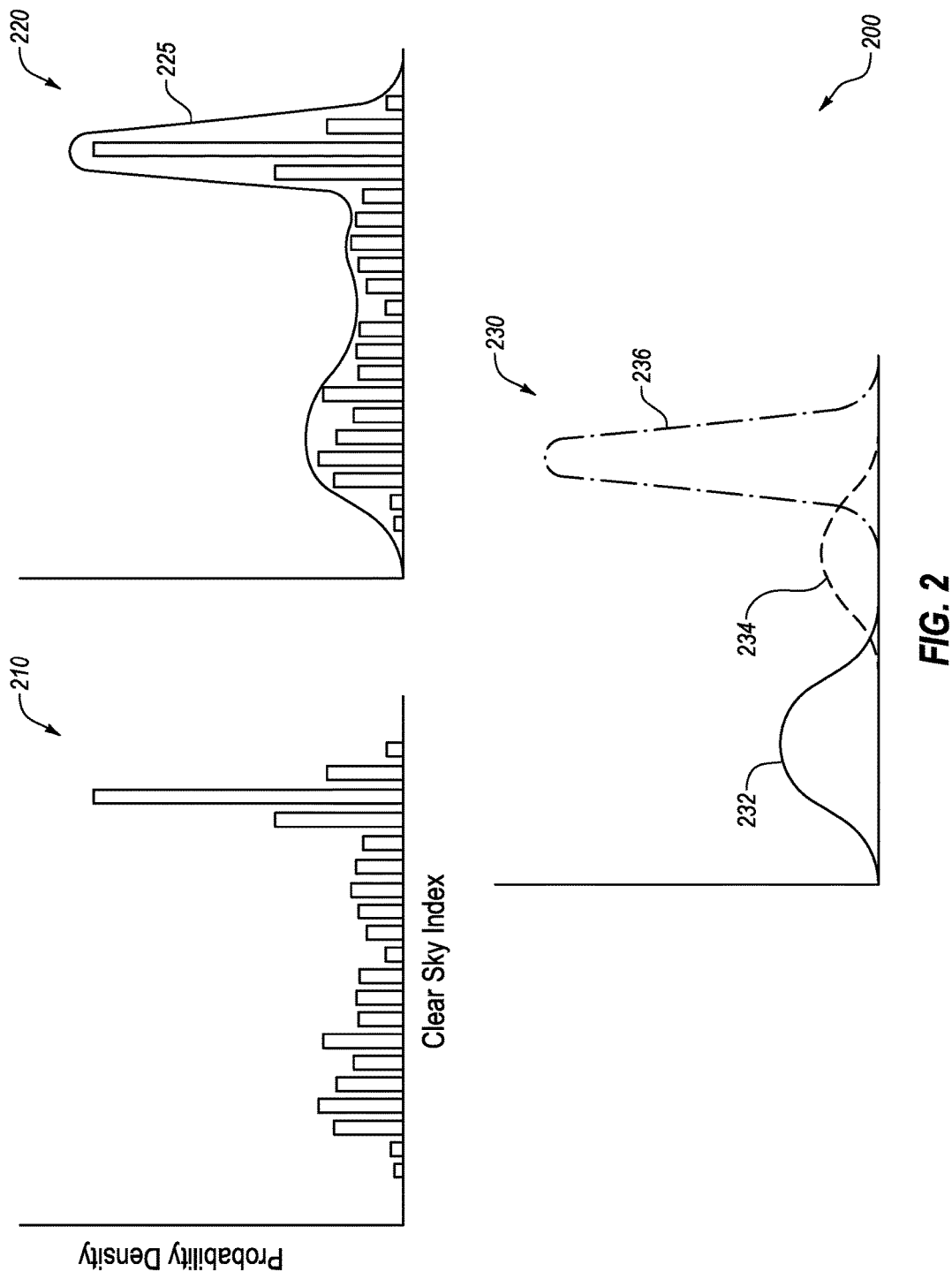
FIG. 2 is a set of example plots used in evaluating a solar power forecast.

FIG. 2 is a set of example plots 200 used in evaluating a solar power forecast. For example, the set of example plots 200 may be used to cluster a normalized test dataset into weather classes. A plot 210 may include a histogram of the normalized test dataset. The histogram may depict the probability density of a given clear sky index. For example, for a given clear sky index, each data point in the normalized test dataset corresponding to that clear sky index may be aggregated such that the percentage of total data points corresponding to the given clear sky index may be plotted in the histogram on the plot 210. In these and other embodiments, data points with a low solar zenith angle may be classified in one or more sub-classes with a separate histogram.

The example set of plots 200 may also include a plot 220 illustrating a curve 225 fit to the histogram. The curve 225 may represent a combination of curves, where each of the curves in the combination may represent a separate and distinct weather class. For example, such a combination of curves may represent a Gaussian mixture model. In some embodiments, each of the curves may be separated into distinct curves from the combined curve 225. For example, a plot 230 may illustrate the separate curves, such as a first curve 232, a second curve 234, and a third curve 236. The first curve 232 may represent an overcast weather class. As illustrated in the plot 230, the first curve 232 may have a broader range of unpredictability than the third curve 236 as the probability distribution is more spread out. Similarly, the second curve 234 may represent a partly cloudy weather class, and may have a broader range of unpredictability than the third curve 236. As illustrated in the plot 230, the first curve 232 may have a generally lower clear sky index than the second curve 234. The third curve 236 may represent a clear weather class. The clear weather class may have the highest clear sky index relative to the other weather classes, and may have a more narrow distribution curve, or a lower degree of unpredictability when compared to the other two weather classes. In some embodiments, the curve 225 of the plot 220 may represent a Gaussian mixture model such that each class may be modeled by a Gaussian distribution model. In these and other embodiments, the first, second, and third curves 232, 234, and 236 may each represent a Gaussian distribution.

In some embodiments, each data point in the normalized test dataset may be clustered with a particular weather class by determining which of the class-specific curves the data point most closely matches. By so doing, a framework may be established against which new forecasts may be analyzed.

Modifications, additions, and omissions may be made to the example set of plots 200 of FIG. 2 without departing from the essence of the present disclosure. For example, any number of weather classes may be used, and there may be a corresponding curve for each of the weather classes in the plot 230. Additionally, the example plots 200 are provided for illustrative purposes, and embodiments of the present disclosure may be implemented without generating the example set of plots 200.

Returning to FIG. 1, after a framework for analyzing forecasts may be established, a new forecast may be obtained, for example, a forecast of irradiance. Such a forecast may be received from the weather information source 120 at the control device 111 or may be generated by the control device 111. The control device 111 may analyze the new forecast to determine the accuracy of the new forecast, or the degree of unpredictability of the new forecast.

In some embodiments, a nearest neighbor of the new forecast may be found in the test dataset. For example, similarities between the new forecast and the test dataset may be analyzed. In some embodiments, the closest value to the forecasted value may be the nearest neighbor. In some embodiments, the forecast may include multiple components of weather information, and similarities between some or all of the components may be considered, and some components may be weighted more heavily than others. In these and other embodiments, the new forecast may be classified in a weather class based on the nearest neighbor. For example, the new forecast may be placed in the same weather class as the nearest neighbor. In these and other embodiments, a solar zenith angle of the new forecast may also be analyzed to determine whether the new forecast has a high solar zenith angle. In these and other embodiments, if the new forecast has a low solar zenith angle, the new forecast may be considered as projecting After the new forecast has been classified in a weather class, the new forecast may be analyzed to determine the accuracy of the new forecast, or the degree of unpredictability of the new forecast. For example, confidence intervals for the new forecast may be determined based on characteristics of the weather class to which the new forecast belongs, or based on characteristics of the nearest neighbor of the new forecast. For example, the control device 111 may determine a degree of unpredictability and/or confidence intervals for the new forecast.

In some embodiments, after the control device 111 has analyzed the new forecast for each of the locations, further analysis may be performed on the relationship between the confidence intervals between the locations. In some embodiments, such an analysis may include both historical irradiance data and previous forecasts of irradiance for the locations being analyzed. In these and other embodiments, covariance between confidence intervals at the different locations may be modeled using a robust variable. To facilitate the modeling, boundaries or other constraints may be imposed on the robust variable. Based on the covariance, an aggregated forecast and/or an aggregated confidence interval may be determined.

In some embodiments, after the control device 111 has determined an aggregated forecast, the control device 111 may alter the operation of the VPP 110 based on the accuracy of the aggregated forecast. For example, the control device 111 may send a message to the solar power generating devices 112, the wind power generating device 113, the fossil fuel power generating device 114, and/or the hydro power generating device 115 to increase or decrease output of power generation. For example, the control device 111 may instruct the solar power generating devices 112 to increase output and may instruct any of the non-solar power generating devices (e.g., the wind power generating device 113, the fossil fuel power generating device 114, and/or the hydro power generating device 115) to decrease output. In these and other embodiments, the modification may be proportional to an output of the analysis, such as the confidence intervals of the aggregated forecast. Additionally or alternatively, the control device 111 may purchase or acquire additional electrical power or provisionally purchase or acquire additional electrical power from the energy market 130 based on the analysis of the aggregated forecast. Additionally or alternatively, the control device 111 may set, modify, alter, reduce, and/or increase the price at which the VPP 110 is offering electrical power on the energy market 130 based on the analysis of the aggregated forecast. For example, using the accuracy of the aggregated forecast, the VPP 110 may be aware of the minimum solar energy production across all of the locations. Knowledge of the minimum energy production across all of the locations may indict to the control device 111 how much additional energy (besides solar energy) may be needed in a given scenario. For example, if the minimum energy production across all of the locations is generated, the control device 111 may determine an energy deficit based on a predicted energy consumption. The control device 111 may acquire or make arrangements to acquire any additional energy through purchase or alternative power production to cover the energy deficit.

The control device 111 may include one or more processors 116 (referred to as the processor 116), a memory 117, one or more storage devices 118 (referred to as the storage device 118), and one or more communication devices 119 (referred to as the communication device 119).

The processor 116 may include any suitable special-purpose or general-purpose computer, computing entity, or processing device including various computer hardware or software modules and may be configured to execute instructions stored on any applicable computer-readable storage media, such as the memory 117 and/or the storage device 118. For example, the processor 116 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 116 may include any number of processors configured to perform, individually or collectively, any number of operations described in the present disclosure. Additionally, one or more of the processors may be present on one or more different electronic devices, such as different devices coupled together or communicating remotely.

In some embodiments, the processor 116 may interpret and/or execute program instructions and/or process data stored in the memory 117. In some embodiments, the processor 116 may fetch program instructions from the storage device 118 and load the program instructions in the memory 117. After the program instructions are loaded into memory 117, the processor 116 may execute the program instructions. In some embodiments, the execution of instructions by the processor 116 may direct and/or control the operation of the VPP 110 and/or the control device 111. For example, the processor 116 may send a message from the control device 111 to one or more of the electrical power generating devices to increase or decrease electrical output.

The memory 117 and the storage device 118 may include computer-readable storage media for carrying or having computer-executable instructions or data structures stored thereon. Such computer-readable storage media may include any available media that may be accessed by a general-purpose or special-purpose computer, such as the processor 116. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), hard disk drives (HDD), solid state drives (SSD), or any other storage medium which may be used to carry or store desired program code in the form of computer-executable instructions or data structures and which may be accessed by a general-purpose or special-purpose computer. The computer-readable storage media may be configured as a stand-alone media or as part of some other system, component, or device. The computer-readable storage media may be configured as a physical media or as a virtualized media. Combinations of any of the above may also be included within the scope of computer-readable storage media. Computer-executable instructions may include, for example, instructions and data configured to cause the processor 116 to perform a certain operation or group of operations.

The communication device 119 may include any component, device, system, or combination thereof configured to transmit or receive information. The communication device 119 may communicate with other devices at other locations, the same location, or even other components within the same system. The communication device 119 may include, without limitation, a modem, a network card (wireless or wired), an infrared communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication device 119 may permit data to be exchanged with the network 140 and/or any other devices described in the present disclosure, including any of the power generating devices.

Modifications, additions, or omissions may be made to the system 100 without departing from the scope of the present disclosure. For example, in some embodiments, the system 100 may include any number of other components that may not be explicitly illustrated or described, such as a nuclear power generating device. As another example, the control device 111, while illustrated as a single device, may be any number of devices or systems communicatively coupled. For example, certain of the tasks performed by the control device 111 may be performed by a server, cloud-based service, or any other remote device, and may be invoked by a client using a web-browser, portable device, etc.

Figure 3:
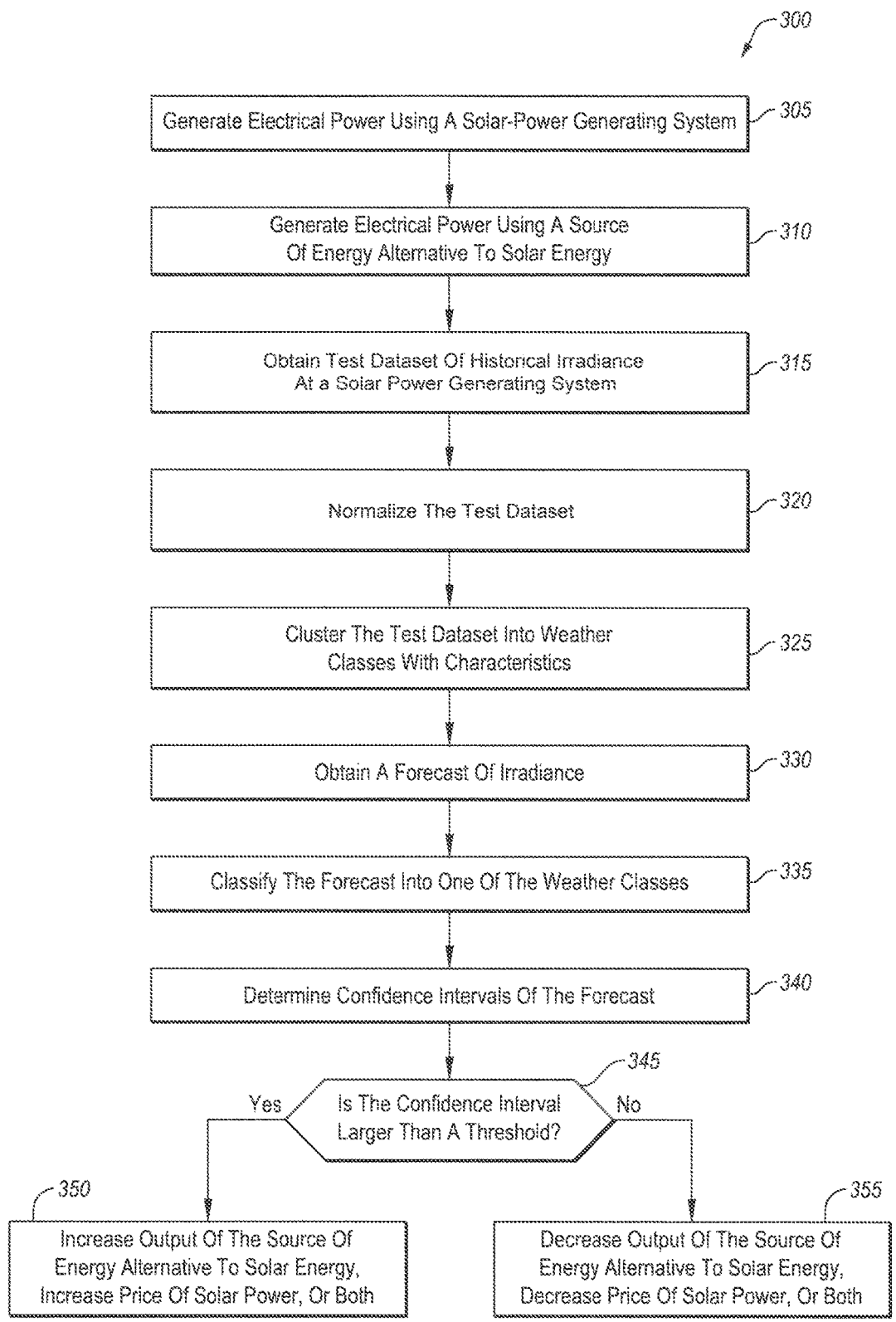
FIG. 3 is flow diagram of an example method of operating a solar power generating system.

FIG. 3 is an example flow diagram of a method 300 of operating a solar power generating system, in accordance with at least one embodiment of the present disclosure. The method 300 may be performed by any suitable system, apparatus, or device. For example, the system 100, the VPP 110, or the control device 111 of FIG. 1 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

At block 305, a solar power generating system may be used to generate electrical power. Such a power generating system may include a VPP (such as the VPP 110 of FIG. 1), or may be any other system with a solar power generating device.

At block 310, a source of energy alternative to solar power may be used to generate electrical power. Such a source of energy may be part of the VPP or may be some other power generating device. Examples of such sources of energy may include wind, nuclear, fossil fuel (e.g., coal, natural gas), or hydro power generating devices.

At block 315, a test dataset of historical irradiance data at the location of the solar power generating system may be obtained. For example, a weather information source (e.g., the weather information source 120 of FIG. 1) may transmit historical data to the solar power generating system. As another example, the solar power generating system may generate, gather, or record the historical irradiance data. For example, a control device (e.g. the control device 111 of FIG. 1) may utilize sensors to measure local weather at the solar power generating system over time to generate the historical irradiance data. In some embodiments, the test dataset may include additional weather information in addition to irradiance data.

At block 320, the test dataset may be normalized based on a clear sky model of irradiance at the location of the solar power generating system. For example, each historical data point in the test dataset at a given time of day may have the irradiance divided by the typical irradiance during a clear sky at that time of day. Such a normalized test dataset may be independent of the time of day considered or independent of the solar zenith angle. The control device may perform such a normalization.

At block 325, the test dataset may be clustered into weather classes, each weather class having a set of corresponding characteristics. For example, a histogram of the normalized test dataset may be generated based on the probability that a given clear sky index would occur in the test dataset. The histogram may have a curve fit to the data, and then a curve for each weather class may be derived from the curve fit to the histogram. Each data point in the test dataset may be clustered into a weather class based on how closely a given data point fits to the curve associated with a particular weather class. As another example, multiple characteristics may be considered, and each data point may be classified based on an analysis of similarities of the data point with multiple characteristics of the set of characteristics of a given weather class. Additionally or alternatively, the characteristics may be weighted in a non-uniform way such that one or more characteristics may have a predominant effect on whether a given data point in the test dataset is clustered into a given weather class. The control device may perform such a clustering.

At block 330, a forecast of irradiance may be obtained. For example, the forecast may be transmitted from the weather information source to the solar power generating system. Additionally or alternatively, the solar power generating system may generate the forecast of irradiance. In some embodiments, the forecast may also include other components of weather information in addition to irradiance.

At block 335, the forecast may be classified into one of the weather classes. For example, a nearest neighbor of the forecast may be identified and, based on the nearest neighbor, the forecast may be classified into one of the weather classes. In some embodiments, such classification may include comparing and/or analyzing one or more characteristics of the forecast with characteristics of the nearest neighbor and/or weather classes. The control device may perform such a classification.

At block 340, confidence intervals of the forecast may be determined. Such a determination may be based on the weather class to which the forecast is classified, and may be based on one or more of the characteristics of the weather class, such as the degree of unpredictability of the weather class, the probability distribution of the weather class, and/or any other characteristics of the weather class. The determination of confidence intervals may also be based on one or more characteristics and/or the weather class of the nearest neighbor of the forecast. The control device may perform such a determination.

At block 345, a determination may be made whether the confidence interval is larger than a threshold value. Such a determination may be made by a control device. At block 350, after a determination that the confidence interval is larger than the threshold, the operation of the solar power generating system may be modified. For example, the output of the source of energy that is alternative to solar power may be increased, or the price of solar energy charged by the solar power generating system may be increased, or both. Additionally or alternatively, output of the solar power generating device may be decreased. Such a modification may occur, for example, by the control device sending a message to the source of energy that is alternative to solar power, sending a message to the solar power generating system, or sending a message to an energy market (e.g., the energy market 130 of FIG. 1).

At block 355, after a determination that the confidence interval is not larger than the threshold, operation of the solar power generating system may be modified. For example, the output of the source of energy that is alternative to solar power may be decreased, or the price of solar energy charged by the solar power generating system may be decreased, or both. Additionally or alternatively, output of the solar power generating device may be increased. Such a modification may occur, for example, by the control device sending a message to the source of energy that is alternative to solar power, sending a message to the solar power generating system, or sending a message to the energy market.

Accordingly, the method 300 may be used to operate a solar power generating system. Modifications, additions, or omissions may be made to the method 300 without departing from the scope of the present disclosure. For example, any of the blocks 305 or 310 may be omitted. As another example, the operations of the method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the present disclosure.

Figure 4A:
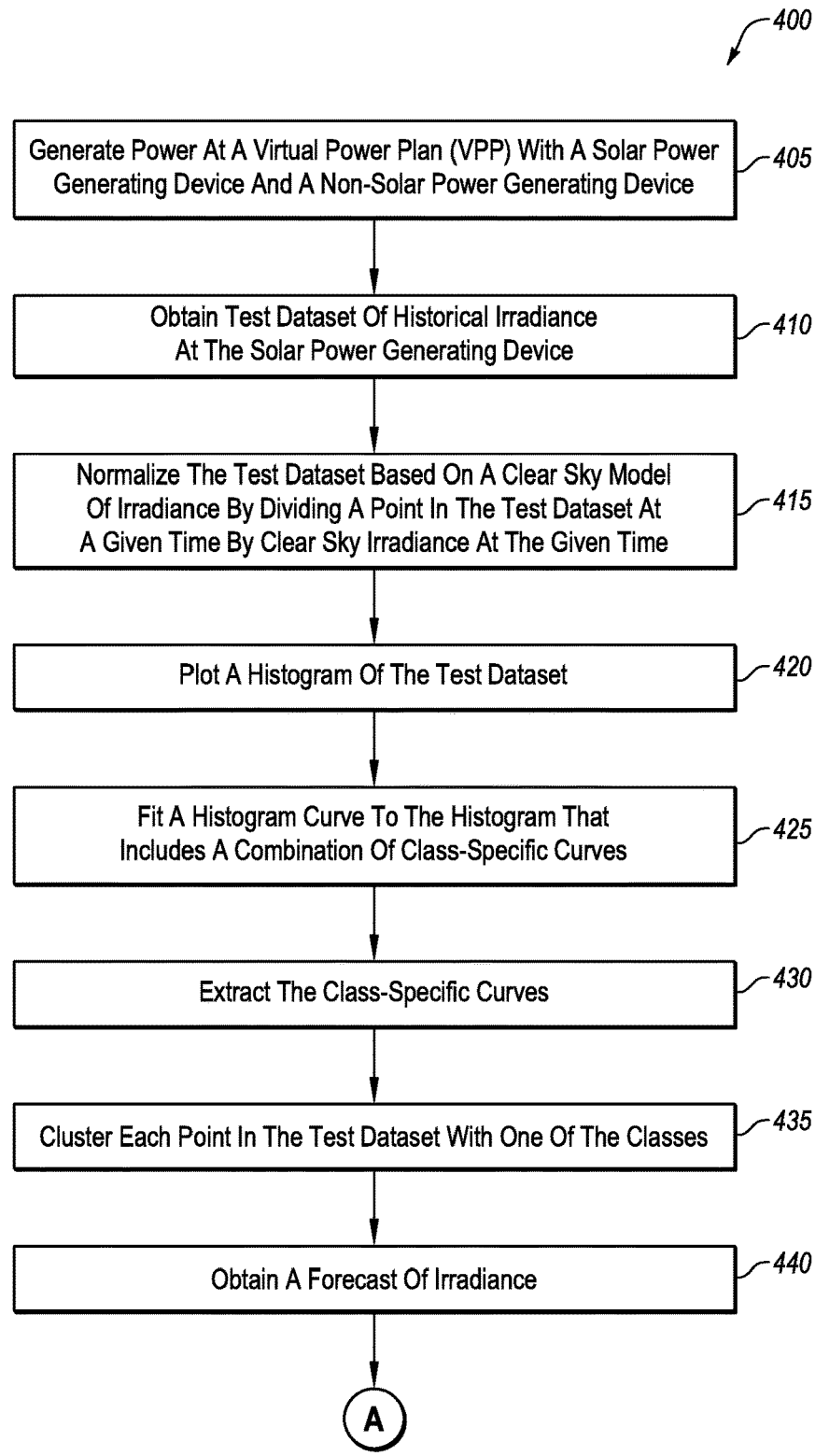
FIGS. 4A and 4B are a flow diagram of an example method of operating a virtual power plant including a solar power generating device.
Figure 4B:
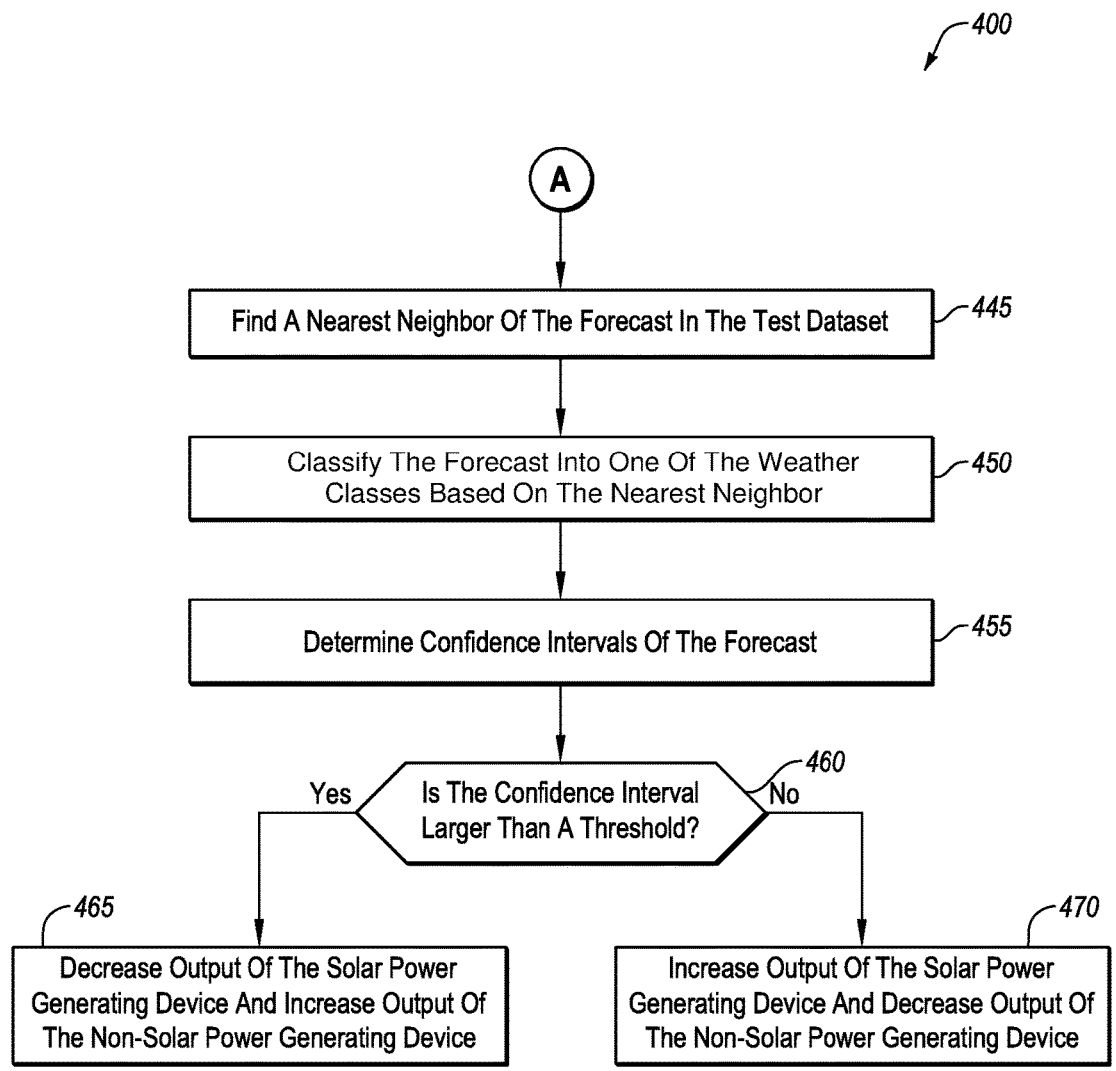

FIGS. 4A and 4B are an example flow diagram of a method 400 of operating a virtual power plant including a solar power generating device, in accordance with at least one embodiment of the present disclosure. The method 400 may be performed by any suitable system, apparatus, or device. For example, the system 100, the VPP 110 or the control device 111 of FIG. 1 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 405, a VPP (e.g., the VPP 110 of FIG. 1) with a solar power generating device (e.g., the solar power generating device 112 of FIG. 1) and at least one non-solar power generating device (e.g., any one of the wind power generating device 113, the fossil fuel power generating device 114, or the hydro power generating device 115 of FIG. 1) may be used to generate electrical power.

At block 410, a test dataset of historical irradiance data at the location of the solar power generating device may be obtained. The block 410 may be similar to the block 315 of FIG. 3.

At block 415, the test dataset may be normalized based on a clear sky model of irradiance at the location of the solar power generating device. Such normalization may include dividing the irradiance of a data point at a given time of day by the typical irradiance during a clear sky at a given time of day for each historical data point in the test dataset. Such normalization may be performed by a control device (e.g., the control device 111 of FIG. 1).

At block 420, a histogram of the test dataset may be plotted. For example, a plot such as the plot 210 of the example set of plots 200 of FIG. 2 may be generated based on the normalized test dataset. Such plotting may be performed by the control device.

At block 430, a histogram curve may be fitted to the histogram. An example of such a curve may include the curve 225 of the plot 220 of FIG. 2. The histogram curve may include a combination curve that includes the combination of class-specific curves. For example, there may be a curve corresponding to each of multiple weather classes to which the test dataset may be clustered. Examples of such classes may include overcast, partly cloudy, or clear. An example of such curves may include the first, second, and third curves 232, 234, and 236 of the plot 230 of FIG. 2. Such fitting may be performed by the control device.

At block 435, the data points in the test dataset may be clustered into one of the classes. In some embodiments, each of the classes may include a corresponding set of characteristics. In these and other embodiments, each data point in the test dataset may be clustered into a weather class based on how closely a given data point fits to the curve associated with a particular weather class. As another example, multiple characteristics may be considered, and each data point may be classified based on an analysis of similarities of the data point with multiple characteristics of the set of characteristics of a given weather class. Additionally or alternatively, the characteristics may be weighted in a non-uniform way such that one or more characteristics may have a predominant effect on whether a given data point in the test dataset is clustered into a given weather class. The control device may perform such a clustering.

At block 440, a forecast of irradiance may be obtained. The block 440 may be similar to the block 330 of FIG. 3.

At block 445 (illustrated in FIG. 4B), a nearest neighbor of the forecast in the test dataset may be found. For example, the control device may find the data point in the test dataset that is most similar to the forecast. Such a finding may include consideration of multiple characteristics of the forecast and the data points in the test dataset. In some embodiments, one or more of the characteristics may be weighted more or less than other characteristics in finding the nearest neighbor of the forecast.

At block 450, the forecast may be classified into one of the weather classes based on the nearest neighbor. For example, the forecast may be placed in the same weather class as the nearest neighbor. Additionally or alternatively, a subset of weather classes may be selected based on the nearest neighbor and the characteristics of each of the subset of weather classes may be compared to the characteristics of the forecast. The classification may be performed by the control device.

At block 455, a confidence interval of the forecast may be determined. The block 455 may be similar to the block 340 of FIG. 3. At block 460, a determination may be made as to whether the confidence interval is larger than a threshold. The block 460 may be similar to the block 345 of FIG. 3.

At block 465, after a determination that the confidence interval is larger than the threshold, operation of the VPP may be modified. For example, the output of the solar power generating device may be decreased and the output of the non-solar power generating device may be increased. In some embodiments, such an increase and/or decrease may be proportional to the confidence interval.

At block 470, after a determination that the confidence interval is not larger than the threshold, operation of the VPP may be modified. For example, the output of the solar power generating device may be increased and the output of the non-solar power generating device may be decreased. In some embodiments, such an increase and/or decrease may be proportional to the confidence interval.

Accordingly, the method 400 may be used to operate a VPP that includes a solar power generating device. Modifications, additions, or omissions may be made to the method 400 without departing from the scope of the present disclosure. For example, the block 405 may be omitted. As another example, the operations of the method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the present disclosure.

Figure 5A:
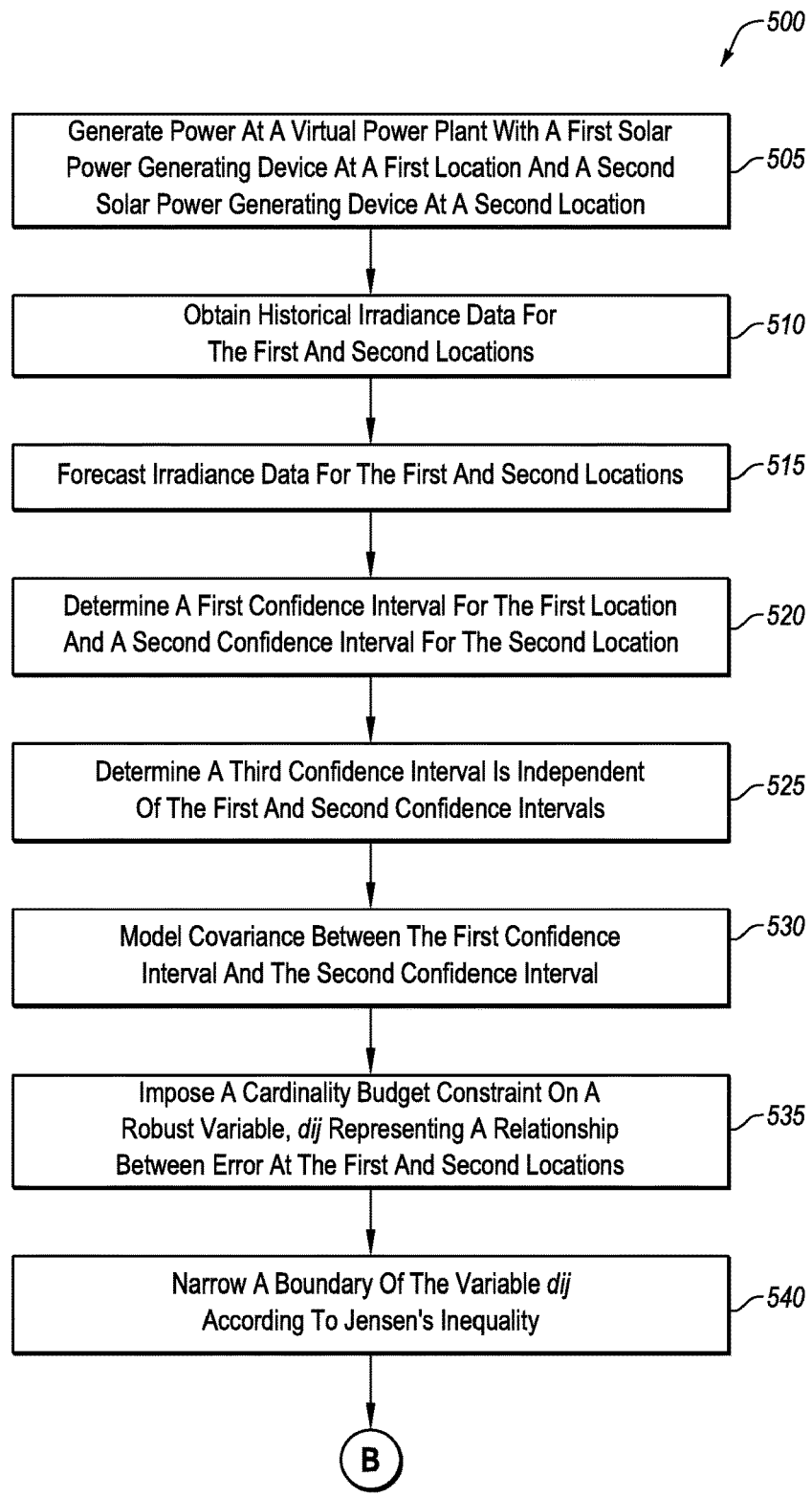
FIGS. 5A and 5B are a flow diagram of an example method of operating a solar power generating system with multiple locations of solar power generating devices.
Figure 5B:
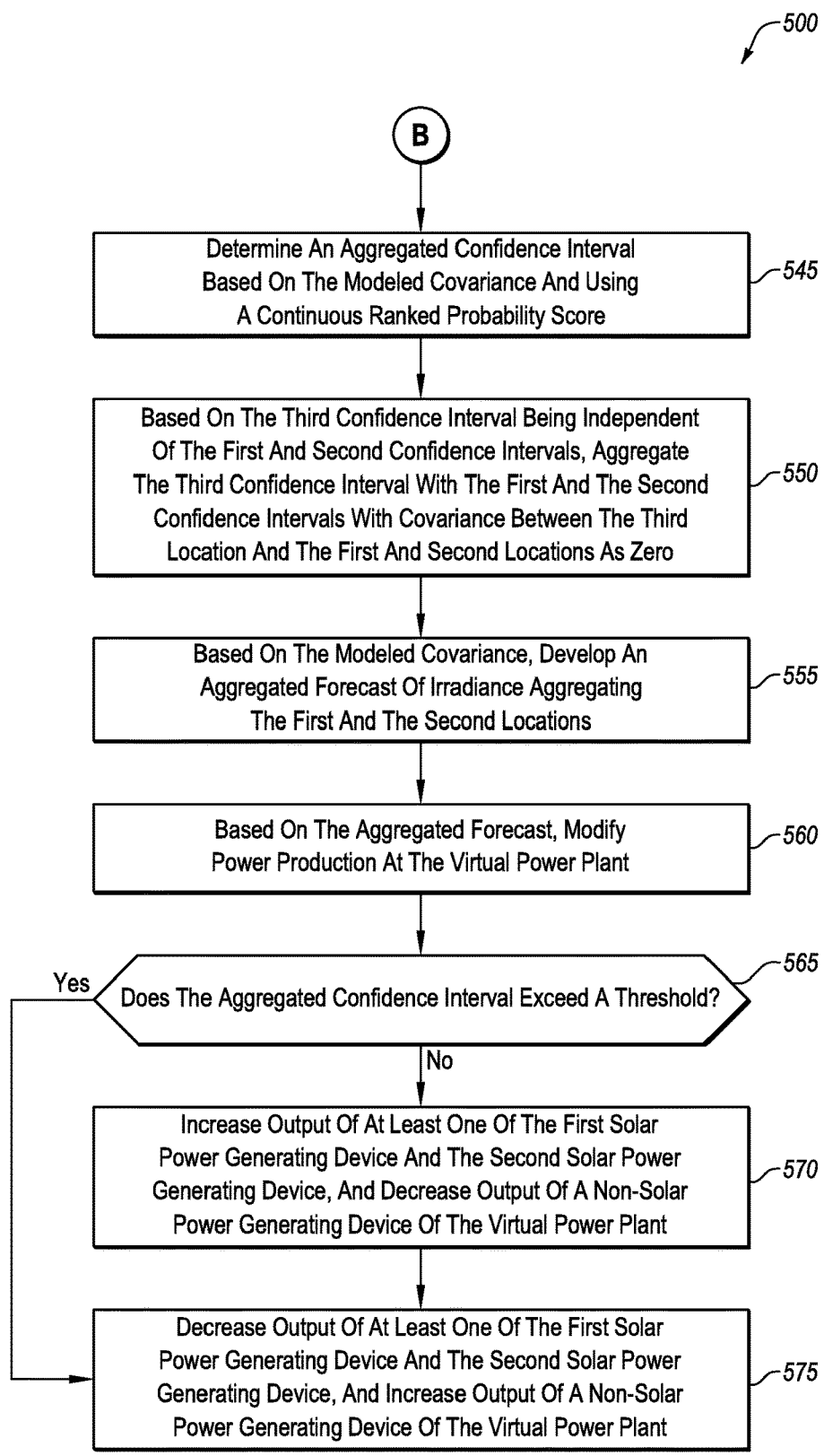

FIGS. 5A and 5B are a flow diagram of an example method 500 of operating a solar power generating system with multiple locations of solar power generating devices, in accordance with at least one embodiment of the present disclosure. The method 500 may be performed by any suitable system, apparatus, or device. For example, the system 100, the VPP 110 or the control device 111 of FIG. 1 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

At block 505, power at a virtual power plant (e.g., the VPP 110 of FIG. 1) may be generated. The virtual power plant may include a first solar power generating device (e.g., the solar power generating device 112a of FIG. 1) at a first location and a second solar power generating device (e.g., the second solar power generating device 112b of FIG. 1) at a second location. In these and other embodiments, the VPP may include a first set of solar power generating devices at the first location distributed in a first density and a second set of solar power generating devices at the second location distributed in a second density. For example, the locations may represent different locales in a city and the solar power generating devices may include any number of customers with solar power generating devices on their property.

At block 510, historical irradiance data for the first and second locations may be obtained. For example, a control device (e.g., the control device 111 of FIG. 1) may monitor the irradiance data for a given duration of time, or may query any number of third party services or providers that may store or monitor the irradiance data for the first and second locations. Additionally or alternatively, the historical irradiance data may include historical forecasts for the locations, such that both historical irradiance data and a corresponding forecast for the same time may be obtained.

At block 515, irradiance data for the first and second locations may be forecast. For example, the control device 111 of FIG. 1 may predict the irradiance data for the locations. As another example, the forecast of irradiance may be obtained from a third party weather prediction service.

At block 520, a first confidence interval for the forecast of the first location and a second confidence interval for the forecast of the second location may be determined. For example, the first and/or second confidence intervals may be determined in a manner similar or analogous to the determination of the confidence intervals according to the method 300 of FIG. 3 and/or the method 400 of FIG. 4. Additionally or alternatively, confidence intervals for the historic forecasts may also be determined.

At block 525, a third confidence interval may be determined for a third location. In these and other embodiments, the third confidence interval may be independent of the first and second confidence intervals. For example, variations or tendencies observed in irradiance or confidence intervals for the first and/or second locations may have no effect and/or be completely uncorrelated with variations or tendencies in the third location. In these and other embodiments, the third confidence interval may be determined in a manner similar or analogous to the determination of the confidence intervals according to the method 300 of FIG. 3 and/or the method 400 of FIG. 4.

At block 530, covariance between the first confidence interval and the second confidence interval may be modeled. In some embodiments, such modeling may be based on historical irradiance data, historical forecasts, confidence intervals of historic forecasts, and/or confidence intervals of a future-looking forecast (e.g., the forecast of block 515). A mathematical description of such a model is included in the present disclosure.

At block 535, a cardinality budget constraint may be imposed on a robust variable, $d_{ij}$, representing a relationship between error at the first and second locations. In these and other embodiments, such an imposition may further the modeling of the covariance performed at the block 530. A mathematical description of such a constraint is included in the present disclosure.

At block 540, a boundary of the variable $d_{ij}$ may be narrowed according to Jensen's Inequality. In these and other embodiments, such a narrowing may further the model of block 530. A mathematical description of such a constraint is included in the present disclosure.

At block 545, an aggregated confidence interval may be determined based on the modeled covariance and using a continuous ranked probability score algorithm. For example, the aggregated confidence interval may represent a confidence interval across both the first and second locations. Additionally or alternatively, the aggregated confidence interval may account for relationships of error between the first and second locations. A mathematical description of such a determination is included in the present disclosure.

At block 550, based on the third confidence interval being independent of the first and second confidence intervals, the third confidence interval may be aggregated with the first and second confidence intervals with covariance between the third location and the first and second locations as zero. For example, such an aggregation may extend the aggregated confidence interval of block 545 to include a location with a confidence interval independent of the confidence intervals already included in the aggregated confidence interval.

At block 555, based on the modeled covariance, an aggregated forecast of irradiance may be developed. Such a forecast may include aggregation of forecast for both the first and the second locations. In these and other embodiments, the aggregated forecast may also be based on and/or include the aggregated confidence interval.

At block 560, based on the aggregated forecast and/or based on the aggregated confidence interval, power production at the VPP may be modified. For example, power production may be increased and/or decreased from any of the power generating devices of the VPP.

At block 565, a determination may be made as to whether the aggregated confidence interval exceeds a threshold. The threshold may be based on a minimum level of confidence required for operation of the VPP. For example, a certain amount of power may be required by consumers served by the VPP and the threshold may represent a boundary of an ability to provide sufficient power to consumers using solar power. If it is determined that the aggregated confidence interval does not exceed a threshold, the method 500 may proceed to block 570. If it is determined that the aggregated confidence interval exceeds a threshold, the method 500 may proceed to block 575.

At block 570, output of at least one of the first or second solar power generating devices may be increased and output of one of the non-solar power generating devices may be decreased. In some embodiments, such an increase and/or decrease may be proportional to the aggregated confidence interval. For example, a control device may send a message to one or more of the power generating devices of the VPP instructing the one or more power generating device to modify output. In these and other embodiments, the output of the first or second solar power generating devices may be a consequence of the amount of irradiance experienced, rather than an affirmative step taken by the system and/or control device. In these and other embodiments, output of the first or second solar power generating devices may be related to the amount of irradiance experienced. For example, if a high irradiance is forecasted, the output of the first and/or second solar power generating devices may be increased and if a low irradiance is forecasted, the output of the first and/or second solar power generating device may be decreased.

At block 575, output of at least one of the first or second solar power generating devices may be decreased and output of one of the non-solar power generating devices may be increased. In some embodiments, such an increase and/or decrease may be proportional to the aggregated confidence interval. For example, a control device may send a message to one or more of the power generating devices of the VPP instructing the one or more power generating device to modify output.

Accordingly, the method 500 may be used to operate a solar power generating system with multiple locations of solar power generating devices. Modifications, additions, or omissions may be made to the method 500 without departing from the scope of the present disclosure. For example, any of the blocks 505, 515, 525, 535, 540, 545, 550, 555, 560, 565, 570, and/or 575 may be omitted. As another example, the operations of the method 500 may be implemented in differing order. For example, the blocks 510 and 515 and the blocks 540, 545, 550, and 555 may be done in a differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the present disclosure.

Figure 6:
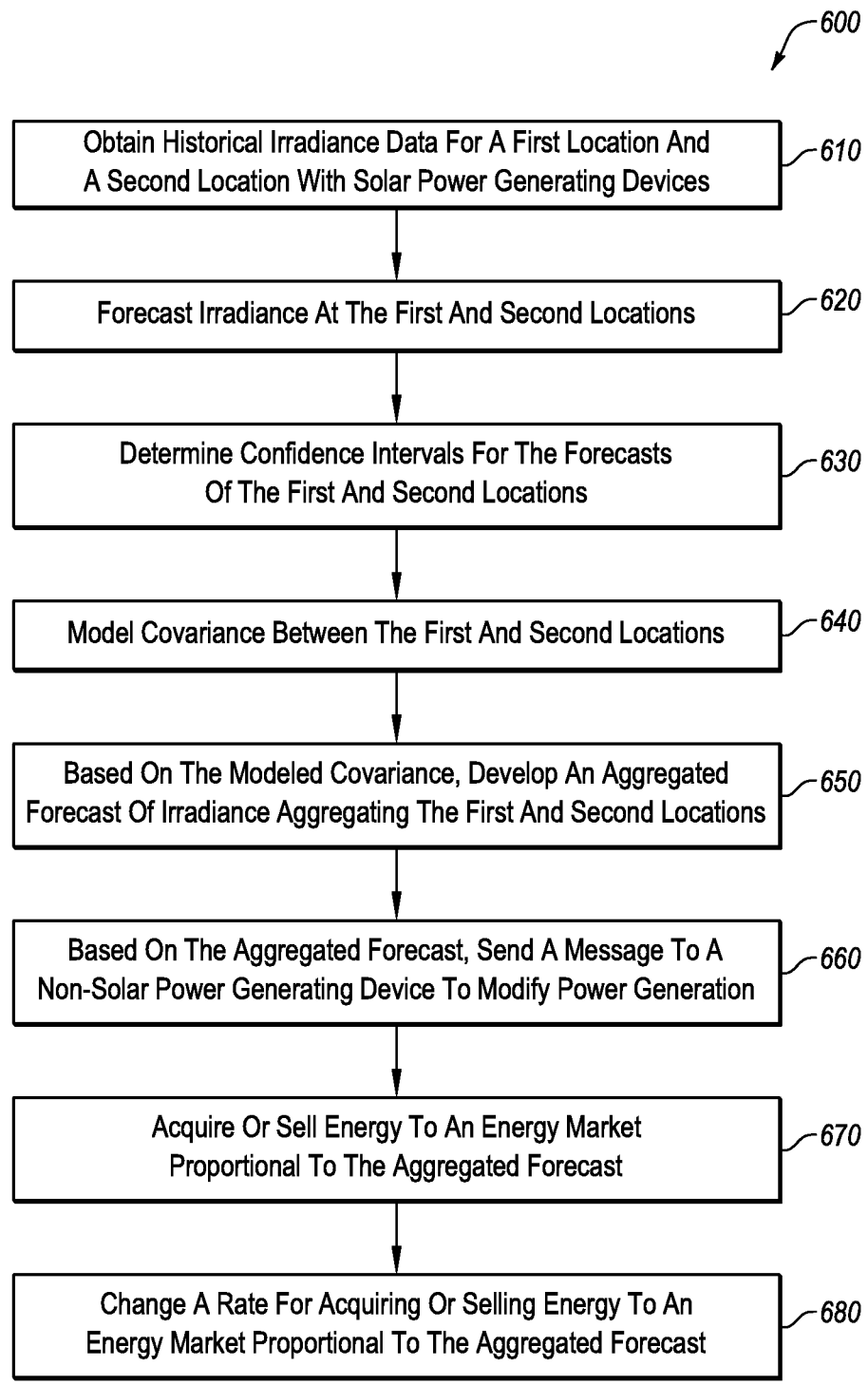
FIG. 6 is a flow diagram of another example method of operating a solar power generating system with multiple locations of solar power generating devices.

FIG. 6 is a flow diagram of another example method 600 of operating a solar power generating system with multiple locations of solar power generating devices, in accordance with at least one embodiment of the present disclosure. The method 600 may be performed by any suitable system, apparatus, or device. For example, the system 100, the VPP 110 or the control device 111 of FIG. 1 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

At block 610, historical irradiance data for a first location and a second location with solar power generating devices (e.g., a first location 152c with the first solar power generating device 112a, and the second location 152e with the second solar power generating device 112b of FIG. 1) may be obtained. The block 610 may be similar or analogous to the block 510 of FIG. 5.

At block 620, irradiance data at the first and second locations may be forecast. The block 620 may be similar or analogous to the block 515 of FIG. 5.

At block 630, confidence intervals for the forecasts of the first and second locations may be determined. The block 630 may be similar or analogous to the block 520 of FIG. 5.

At block 640, covariance between the first and second locations may be modeled. The block 640 may be similar or analogous to the block 530 of FIG. 5.

At block 650, based on the modeled covariance, an aggregated forecast of irradiance aggregating the first and second locations may be developed. The block 650 may be similar or analogous to the block 555 of FIG. 5.

At block 660, based on the aggregated forecast, a message may be sent to a non-solar power generating device to modify power generation. For example, if the aggregated forecast indicates that a high amount of irradiance is expected, the message may instruct the non-solar power generating device to decrease power generation. As another example, if the aggregated forecast indicates that a low amount of irradiance is expected, the message may instruct the non-solar power generating device to increase power generation. As an additional example, if an aggregated confidence interval of the aggregated forecast is high (e.g., there is a high degree of unpredictability in the forecast), the message may instruct the non-solar power generating device to increase power generation to account for the unpredictability.

At block 670, energy may be acquired from or sold to an energy market (e.g., the energy market 130 of FIG. 1) proportional to the aggregated forecast. For example, if the aggregated forecast indicates that a high amount of irradiance is expected, energy may be sold to the energy market. As another example, if the aggregated forecast indicates that a low amount of irradiance is expected, energy may be acquired from the energy market. As an additional example, if an aggregated confidence interval of the aggregated forecast is high (e.g., there is a high degree of unpredictability in the forecast), energy may be acquired from the energy market to cover the unpredictability.

At block 680, a rate for acquiring or selling energy to an energy market (e.g., the energy market 130 of FIG. 1) may be changed proportional to the aggregated forecast. For example, if the aggregated forecast indicates that a high amount of irradiance is expected, a rate for selling energy to the energy market may be decreased. As another example, if the aggregated forecast indicates that a low amount of irradiance is expected, a rate for selling energy to the energy market may be increased. As an additional example, if an aggregated confidence interval of the aggregated forecast is high (e.g., there is a high degree of unpredictability in the forecast), a rate for selling energy to the energy market may be increased.

Accordingly, the method 600 may be used to operate a solar power generating system with multiple locations of solar power generating devices. Modifications, additions, or omissions may be made to the method 600 without departing from the scope of the present disclosure. For example, the blocks 660, 670, and/or 680 may be omitted. As another example, the operations of the method 600 may be implemented in differing order. For example, any of the blocks 660, 670, and/or 680 may be performed in differing order. Additionally or alternatively, two or more operations may be performed at the same time. For example, any of the blocks 660, 670, and/or 680 may be performed at the same time. Furthermore, the outlined operations and actions are only provided as examples, and some of the operations and actions may be optional, combined into fewer operations and actions, or expanded into additional operations and actions without detracting from the essence of the present disclosure.

By way of example, certain aspects of at least one embodiment of the present disclosure may be described with reference to equations and/or mathematical operations. For example, the analysis to describe the future probability distribution of solar power from historical data may be described as $$P(y_{t+h} - \hat{y}_{t+h} | x_t)$$

where $y_{t+h}$ may represent the true forecast value at t+h; $\hat{y}_{t+h}$ may represent a forecast at t+h; $x_t = (Y_t, Z_{t+h})$, where h=

{1, ..., H}; and $Y_t = \{y_1, y_t\}$ may be a vector of analog observations prior to and including time t; and $Z_{t+h} = \{z_1, ..., z_t, z_{t+h}\}$ may be a vector of analog exogenous variables prior to and including time t+h; and for n number of weather information variables, $z_i \in R^n$ where i=1, ..., t+h.

In some embodiments, normalization of a test dataset may be represented by example mathematical operations. For example, for clear-sky index (kt), the clear-sky index may be normalized by $$y_t = kt_{(t)} = \frac{I_{(t)}}{I_{(t)}^{clr}}$$

where $I_{(t)}$ may be the solar irradiance (e.g., either the global irradiance or the normal irradiance) and $I_{(t)}^{clr}$ may be the clear-sky irradiance model for the given time, and the operation may be performed for each point in time for the historical data of the test dataset.

In some embodiments, various aspects of plotting a histogram and/or clustering the test dataset into multiple classes may be represented by mathematical operations. For example, to determine sky cover based on the clear-sky index, a function $f$ may be introduced $$kt_{(f)} = f(\text{sky cover}_1, ..., \text{sky cover}_t)$$

and a function g may be utilized for plotting the probability density function of the clear sky index values.

$$\text{sky cover}_{(t)} = f^{-1}(kt_{(t)}) = g_t(kt_{(t)})$$

As another example, each class may be modeled by a Gaussian distribution model, described by $$g_t = \propto_1 N_1 + ... + \propto_p N_p$$

where $g_t$ may represent the combined curve (e.g. the curve 225 of the plot 220 of FIG. 2) and $\propto_1 N_1 + ... + \propto_p N_p$ may represent the various Gaussian distribution models contributing to the combined curve, with $\propto$ indicating the probability of a given weather class and N representing one of the Gaussian distribution curves of a given weather class in the combined curve, and p representing the number of classes. In some embodiments, data points with a low solar zenith angle may be excluded. In some embodiments, expectation maximization may be used to find a correct class for each data point in the test data set, for example, using the equation $$P(Q_i|y) = \frac{P(y|Q_i)P(Q_i)}{P(y)}$$

where $Q_i$ represents the i$^{th}$ weather class (e.g., the i$^{th}$ class derived from the histogram). For example, if using the classes of overcast, partly cloudy, and clear, i may iteratively cycle through each of the classes. To facilitate determination of the various $\propto$ values, $P(Q_i) = \propto_i$, and $\propto_1 + ... + \propto_p = 1$, where $P(Q_i)$ may be derived by $$P(y|Q = Q_i) = f(y|N(\mu_i, \sigma_i)) = \frac{1}{\sigma_i \sqrt{2\pi}} e^{-\frac{(y-\mu_i)^2}{\sigma_i^2}}$$

Thus, using these mathematical operations, each curve for each of the weather classes may be extracted from the combined curve.

In some embodiments, finding the nearest neighbor may utilize a k-nearest neighbor (k-NN) algorithm to find the nearest neighbor, and may utilized a general pattern search algorithm for weighted distances to the nearest neighbor. For example, the test dataset for analyzing a new forecast may be represented by the equation $$S = (z_t, s_t) \in R^{mn} \times \{1, ..., p\}$$

where S may represent the space of the test dataset, $s_t$ may represent the label of the new forecast point $z_t$ in the dataset, and m may represent the number of points in the test dataset. Utilizing the test dataset, a prediction may be made as to the probability the forecast belongs in a given weather class using the equation:

$$P(y = \Gamma_k(S, z_t) | z_t, s_t, k) = \frac{1}{k} \sum_{(z_t, s_t) \in S} 1(\Gamma_k(N_k(z_t, S) = s_t))$$

where $\Gamma_k(S, z_t)$ may represent the prediction made on $z_t$ using its k number of nearest neighbors in the space S, and where $N_k(z_t, S)$ are the indices of the k nearest points to $z_t$ in the space S, and 1(e) is an indicator function in which $$1(e) = \begin{cases} 1 & \text{if } e \text{ is ture} \\ 0 & \text{if } e \text{ is false} \end{cases}$$

In these and other embodiments, the similarity criteria for the nearest neighbors may be based on weighted distance functions calculated using the general pattern search algorithm, which may function according to the equation:

$$\|z_i - z_j\| = \sqrt{\sum_{l=1}^{n} w_l \|z_{l,i} - z_{l,j}\|^2}$$

where w is the weighting function and $$\sum_{i=1}^{n} w_i = 1$$

In some embodiments, after a forecast has been classified in a given class, a Kriging model may be used to determine the error distribution or the confidence intervals of the forecast. Such an analysis may be characterized as mathematical equations and/or operations. For example, a predictor of the error $e_{t+h}$ may be characterized by the equations:

$$\hat{e}_{t+h} = \mathbb{E}[e_{t+h} | x_t = (\Delta Y_t, Z_t, s_p, z_{t+h})]$$

$$\hat{e}_{t+h} = 1 \cdot \hat{\mu}_h(z_{t+h}) + r_{s_p}(z_{t+h}, z_{t_p})^T R_{s_p}(Z_{t,s_p}, Z_{t,s_p})^{-1}(\Delta Y_{t,s_p} - 1 \cdot \hat{\mu}_h(z_{t+h}))$$

where $\Delta Y_{t,s_p}$ may represent the forecast error history at the class $s_p$, $R_{s_p}(Z_{t,s_p}(i), Z_{t,s_p}(j))$ may represent the correlation model between $\Delta Y_{t,s_p}(i)$ and $\Delta Y_{t,s_p}(j)$, and $r_{s_p}(z_{t+h}, z_{t_p})$ may be a vector of correlation between $e_{t+h}$ and $\Delta Y_{t,s_p}(i)$, and $$\hat{\mu}_h(z_{t+h}) = \frac{1^T R_{s_p}(Z_{t,s_p}, Z_{t,s_p})^{-1} \Delta Y_{t,s_p}}{1^T R_{s_p}(Z_{t,s_p}, Z_{t,s_p})^{-1} 1}$$

-continued $$\hat{\sigma}^2_{s_p}(z_{t+h}) = \frac{(1\cdot\hat{\mu}_h(z_{t+h}) - \Delta Y_{t,s_p})^T R_{s_p}(Z_{t,s_p}, Z_{t,s_p}; \theta)^{-1}(1\cdot\hat{\mu}_h(z_{t+h}) - \Delta Y_{t,s_p})}{m}$$

$$R_{s_p}(Z_{t,s_p}(i), Z_{t,s_p}(j); \theta) = \exp\left(-\sum_{l=1}^{n}\theta_l(z_{il} - z_{jl})^{ql}\right)$$

In some embodiments, a modified Cholesky decomposition may be used for the correlation matrix $R_{s_p}(\theta) = C_{s_p}(\theta)C_{s_p}^T(\theta)$ with q set at 1. For the value of $\theta$, the optimal value may be maximized using log-likelihood using a pattern search algorithm, for example, using the equation:

$$J_{s_p}(z_{t+h}; \theta) = \frac{-(m\log\hat{\sigma}^2_{s_p}(z_{t+h}) + \log|R_{s_p}(Z_{t,s_p}, Z_{t,s_p}; \theta)|)}{2}$$

or minimized using the equation:

$$J_{s_p}(z_{t+h}; \theta) = \hat{\sigma}^2_{s_p}(z_{t+h})\det(C(\theta))^{2/m}$$

where $$\hat{\sigma}^2_{s_p}(z_{t+h}) = \frac{(1\cdot\hat{\mu}_h(z_{t+h}) - \Delta Y_{t,s_p})^T R_{s_p}(Z_{t,s_p}, Z_{t,s_p}; \theta)^{-1}(1\cdot\hat{\mu}_h(z_{t+h}) - \Delta Y_{t,s_p})}{m}$$

Using these values, a prediction for the error forecast $e_{t+h}$ and MSE may be calculated as $$MSE(\hat{e}_t) = \mathbb{E}[(\hat{e}_t - e_t)^2]$$
$$= \mathbb{E}[(\hat{e}_t - \mathbb{E}[\hat{e}_t])^2] + (\mathbb{E}(\hat{e}_t - e_t))^2$$
$$= \text{Var}(\hat{e}_t) + \text{Bias}(\hat{e}_t, e_t)^2$$

where the probability distribution of the forecast error may be computed as $$e_{t+h} = y_{t+h} - \hat{y}_{t+h}$$

$$\hat{e}_{t+h} = N(\mu_h, \sigma_h)$$

$$y_{t+h} = y_{t+h} + N(\mu_h, \sigma_h)$$

where $e_{t+h}$ may represent the real value for error, $\hat{e}_{t+h}$ may represent the error distribution calculated in accordance with the present disclosure, Using these calculations, the expected value and variance of the error for the forecast may be determined, for example, by the equations $$\sigma_h = \sqrt{MSE(\hat{e}_{t+h}) - \text{Bias}(\hat{e}_{t+h}, e_{t+h})^2}$$

$$\mu_h = \hat{e}_{t+h}$$

$$y_{t+h} = \hat{y}_{t+h} + N(\mu_h, \sigma_h) y_{t+h} = \hat{y}_{t+h} + \hat{e}_{t+h}$$

where $\mu_h$ may represent the mean value of error, and $\sigma_h$ may represent variance associated with the error, and a distribution of error, $\hat{e}_{t+h}$ may be obtained.

By way of further example, certain aspects of at least one embodiment of the present disclosure may be described with reference to equations and/or mathematical operations. For example, in some embodiments, information such as the mean value of error and the variance associated with the error for multiple locations may be aggregated to establish an aggregated forecast.

In some embodiments, historical data such as the true value of irradiance (e.g., GHI) and a forecasted irradiance may be collected for multiple locations at various times t:

$$(y_i(t), \hat{y}_i(t)), i=1, \ldots, N$$

where $y_i(t)$ may represent the true value of irradiance at time t and $\hat{y}_i(t)$ may represent the forecasted value of irradiance at time t across N locations. In these and other embodiments, the error distribution for the multiple locations may be represented by:

$$\hat{e}_i(t) \sim \theta(\mu_i(t), \sigma_i(t)), i=1, \ldots, N$$

where $\hat{e}_i(t)$ may represent the forecasted error distribution at time t, and $\theta(\mu_i(t), \sigma_i(t))$ may represent the probability distribution (e.g., a Gaussian distribution) of the error with mean value of forecasted error $\mu_i(t)$ and variance of forecasted error $\sigma_i(t)$ at time t across the N locations. In some embodiments, $\mu_i(t)$ and $\sigma_i(t)$ may be determined as described in the present disclosure. Additionally or alternatively, the actual error may be determined for each location, represented by:

$$e_i(t) = \hat{y}_i(t) - y_i(t), i=1, \ldots, N$$

where $e_i(t)$ may represent the actual error at time t across the N locations. In these and other embodiments, the aggregated error (e.g., an aggregated confidence interval) may be represented by $$Er(t) = \text{Real Measured Aggregated Power Output} - \text{Forecasted Aggregated Power Output}$$

which may also be represented by $$Er(t) \sim \sum_{1}^{N} e_i(t)$$

In some embodiments, the variance of the aggregated error (e.g., an aggregated confidence interval) may be beneficial to determining an aggregated forecast. In some embodiments, the error between locations may be independent of each other. In these and other embodiments, the variance may be represented by:

$$\text{Var}(Er(t)) = \frac{\sqrt[2]{\sum_{1}^{N} p_i^2 \sigma_i(t)}}{\sum_{i}^{N} p_i \mu_i(t)}$$

where $p_i$ may represent a distribution of solar power generating devices at location i.

In some embodiments, the error between locations may be dependent upon each other. In these and other embodiments, the variance may be represented by:

$$\text{Var}(Er(t)) = \frac{\sqrt[2]{\sum_{1}^{N} p_i^2 \sigma_i(t) + 2\sum_{1}^{n}\sum_{1}^{n} p_i p_j \text{cov}(e_i(t), e_j(t))}}{\sum_{i}^{N} p_i \mu_i(t)}$$

where $\text{cov}(e_i(t), e_j(t))$ may represent the covariance between the error at time t at locations i and j. In modeling the covariance, a robust variable $d_{ij}$ may be introduced that may represent the relationship of the error between location i and j. In these and other embodiments $$cov(e_i(t), e_j(t)) = d_{ij} \cdot \sigma_i(t) \cdot \sigma_j(t)$$

In these and other embodiments, the range of the robust variable d may be represented by $D_0$:

$$D_0 = \{d_{it} : D_{it}^l \leq d_{it} \leq D_{it}^u, \forall t, \forall i \in N\}$$

where $D_0$ may represent a set that may define the range of the robust variable d for all values of t and i through the N locations. Additionally or alternatively, a cardinality budget constraint may be imposed as follows:

$$\sum_{i=1}^{N} \sum_{t=1}^{T} \left\| \frac{d_{it} - \hat{d}_{it}}{\hat{d}_{it}} \right\| \leq \Gamma$$

where T may represent the maximum time instance being analyzed and $\Gamma$ may represent a maximum cardinality constraint.

Additionally or alternatively, a Jensen's Inequality (e.g., generally of the form $\mathbb{E}[Z] \leq \sqrt{\mathbb{E}(Z^2)}$ where $\mathbb{E}$ may represent the expected value) may be introduced to narrow the boundary of D as illustrated below:

$$\frac{\sqrt[2]{\sum_{1}^{N} p_i^2 \sigma_i(t) + 2 \sum_{1}^{n} \sum_{1}^{n} p_i p_j \text{cov}(e_i(t), e_j(t))}}{\sum_{i}^{N} p_i \mu_i(t)} \leq \frac{\sqrt{\sum_{1}^{N} p_i \sigma_i^2(t) + \sum_{i}^{N} p_i^2 \sigma_i^2(t)}}{\left(\sum_{i}^{N} p_i \mu_i(t)\right)^2}$$

In some embodiments, an optimization model may be constructed to provide an aggregated forecast according to the following equations:

$$\text{Min: } CRPS\left(F \middle| \sum_{1}^{N} \hat{y}_i(t)\right) = \int_{-\infty}^{\infty} \left(F - 1\left(y \geq \sum_{1}^{N} \hat{y}_i(t)\right)\right) dy$$

where CRPS may represent a continuous ranked probability score, and may be subject to $$\text{Var}(Er(t)) = \frac{\sqrt[2]{\sum_{1}^{N} p_i^2 \sigma_i(t) + 2\sum_{1}^{n}\sum_{1}^{n} p_i p_j d_{ijt} \cdot \sigma_i(t) \cdot \sigma_j(t)}}{\sum_{i}^{N} p_i \mu_i(t)},$$

$$D_0 = \{d_{it}: D_{it}^\ell \leq d_{it} \leq D_{it}^u, \forall t, \forall i \in N\},$$

$$\sum_{i=1}^{N} \sum_{t=1}^{T} \left\| \frac{d_{it} - \hat{d}_{it}}{\hat{d}_{it}} \right\| \leq \Gamma, \text{ and}$$

$$\text{Var}(Er(t)) \leq \sqrt{\frac{\sum_{1}^{N} p_i \sigma_i^2(t) + \sum_{i}^{N} p_i^2 \sigma_i^2(t)}{\left(\sum_{i}^{N} p_i \mu_i(t)\right)^2}}$$

In these and other embodiments, the optimization model may be solved using a distributionally robust optimization solving technique.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of modifying energy output, the method comprising:
   generating power at a virtual power plant, the virtual power plant including a first solar power generating device at a first location and a second solar power generating device at a second location;
   obtaining first historical irradiance data for the first location and second historical irradiance data for the second location, both the first historical irradiance data and the second historical irradiance data normalized to be independent of solar zenith angle;
   determining a weather class of a plurality of weather classes for each location data point in the first historical irradiance data and the second historical irradiance data based on each location data point having a predominant characteristic;
   forecasting irradiance at the first location as a first forecast and irradiance at the second location as a second forecast;
   determining one or more weather classes of the plurality of weather classes for the first forecast and the second forecast based on a respective characteristic of the first forecast and the second forecast;
   determining a first confidence interval of the first forecast and a second confidence interval of the second forecast, the first confidence interval based on the weather class of the first forecast and a weather class of a nearest neighbor location to the first location, the second confidence interval based on the weather class of the second forecast and a weather class of a nearest neighbor location to the second location;
   modeling covariance between the first confidence interval and the second confidence interval;
   based on the modeled covariance between the first confidence interval and the second confidence interval, developing an aggregated forecast of irradiance aggregating forecasted irradiance at the first location and forecasted irradiance at the second location; and
   based on accuracy of the aggregated forecast being above or below a threshold, altering operation of the virtual power plant, which includes increasing output or decreasing output of a non-solar power generating device in the virtual power plant proportional to the aggregated forecast.

2. The method of claim 1, wherein modeling covariance comprises imposing a cardinality budget constraint on a variable $d_{ij}$ representing a relationship between an error at the first location (i) and an error at the second location (j).

3. The method of claim 2, wherein modeling covariance further comprises narrowing a boundary of a range of the variable $d_{ij}$ according to Jensen's Inequality.

4. The method of claim 1, wherein altering operation of the virtual power plant includes one of:
   of power production at the virtual power plant, increasing output of at least one of the first solar power generating device and the second solar power generating device; or
   of power production at the virtual power plant, decreasing output of at least one of the first solar power generating device and the second solar power generating device.

5. The method of claim 1, wherein developing the aggregated forecast comprises
   determining an aggregated confidence interval based on the modeled covariance and using a continuous ranked probability score.

6. The method of claim 5, wherein:
   the virtual power plant further comprises a third solar-power generating device at a third location; and
   after determining that a third confidence interval of a third forecast at the third location is independent of the first confidence interval and the second confidence interval, determining an aggregated confidence interval includes aggregating the third confidence interval with the first confidence interval and the second confidence interval with a covariance between the third location and the first and second locations as zero.

7. The method of claim 1, wherein:
   the virtual power plant includes a first plurality of solar power generating devices at the first location distributed in a first density and a second plurality of solar power generating devices at the second location distributed in a second density; and
   the aggregated forecast is based on the first and the second densities that correspond to the first location with the first confidence interval of the first forecast and the second location with the second confidence interval of the second forecast, respectively.

8. A system that modifies solar power generation, the system comprising:
   a power-distribution network servicing a first customer with a first solar power generating device at a first location and a second customer with a second solar power generating device at a second location;
   a non-solar power generating device that generates a modifiable amount of non-solar power in response to one or more operations; and
   a control device configured to perform the one or more operations, including:
      obtaining first historical irradiance data for the first location and second historical irradiance data for the second location, both the first historical irradiance data and the second historical irradiance data normalized to be independent of solar zenith angle;
      determining a weather class of a plurality of weather classes for each location data point in the first historical irradiance data and the second historical irradiance data based on each location data point having a predominant characteristic;
      forecasting irradiance at the first location as a first forecast and at the second location as a second forecast;
      determining one or more weather classes of the plurality of weather classes for the first forecast and the second forecast based on a respective characteristic of the first forecast and the second forecast;
      determining a first confidence interval of the first forecast and a second confidence interval of the second forecast, the first confidence interval based on the weather class of the first forecast and a weather class of a nearest neighbor location to the first location, the second confidence interval based on the weather class of the second forecast and a weather class of a nearest neighbor location to the second location;
      modeling covariance between the first confidence interval and the second confidence interval;

based on the modeled covariance between the first confidence interval and the second confidence interval, developing an aggregated forecast of irradiance aggregating forecasted irradiance at the first location and forecasted irradiance at the second location; and based on accuracy of the aggregated forecast being above a first threshold or below a second threshold, sending a message that causes the non-solar power generating device to modify power generation proportional to the aggregated forecast.

9. The system of claim 8, wherein the control device is further configured to acquire additional energy from an energy market or sell additional energy to the energy market proportional to the aggregated forecast.

10. The system of claim 8, wherein the control device is further configured to change a rate for acquiring or selling energy on an energy market proportional to the aggregated forecast.

11. The system of claim 8, wherein modeling covariance comprises imposing a cardinality budget constraint on a variable $d_{ij}$ representing a relationship between an error at the first location (i) and an error at the second location (j).

12. The system of claim 11, wherein modeling covariance further comprises narrowing a boundary of a range of the variable $d_{ij}$ according to Jensen's Inequality.

13. The system of claim 8, wherein developing the aggregated forecast comprises
determining an aggregated confidence interval based on the modeled covariance and using a continuous ranked probability score.

14. The system of claim 8, wherein:
the power-distribution network services a third solar-power generating device at a third location; and
after determining that a third confidence interval of a third forecast at the third location is independent of the first and second forecasts, determining an aggregated confidence interval includes aggregating the third confidence interval with the first and second confidence intervals with a covariance between the third location and the first and second locations as zero.

15. The system of claim 8, wherein
the first location includes a first plurality of solar power generating devices distributed in a first density and the second location includes a second plurality of solar power generating devices distributed in a second density; and
the aggregated forecast is based on the first and the second densities that correspond to the first location with the first confidence interval of the first forecast and the second location with the second confidence interval of the second forecast, respectively.

16. The system of claim 8, wherein the non-solar power generating device includes one or more of wind power, hydraulic power, coal power, nuclear power, or natural gas power.

17. A non-transitory computer readable medium that includes computer-readable instructions stored thereon that are executable by one or more processors to perform or control performance of operations, the operations comprising:

obtaining first historical irradiance data for a first location and second historical irradiance data for a second location, the first location including a first solar power generating device and the second location including a second solar power generating device, and both the first historical irradiance data and the second historical irradiance data normalized to be independent of solar zenith angle;

determining a weather class of a plurality of weather classes for each location data point in the first historical irradiance data and the second historical irradiance data based on each location data point having a predominant characteristic;

forecasting irradiance at the first location as a first forecast and at the second location as a second forecast;

determining one or more weather classes of the plurality of weather classes for the first forecast and the second forecast based on a respective characteristic of the first forecast and the second forecast;

determining a first confidence interval of the first forecast and a second confidence interval of the second forecast, the first confidence interval based on the weather class of the first forecast and a weather class of a nearest neighbor location to the first location, the second confidence interval based on the weather class of the second forecast and a weather class of a nearest neighbor location to the second location;

modeling covariance between the first confidence interval and the second confidence interval;

based on the modeled covariance between the first confidence interval and the second confidence interval, developing an aggregated forecast of irradiance aggregating forecasted irradiance at the first location and forecasted irradiance at the second location; and based on accuracy of the aggregated forecast being above a first threshold or below a second threshold, sending a message to a non-solar power generating device that causes the non-solar power generating device to modify power generation proportional to the aggregated forecast.

18. The non-transitory computer readable medium of claim 17, the operations further comprising acquiring additional energy from an energy market or selling additional energy to the energy market proportional to the aggregated forecast.

19. The non-transitory computer readable medium of claim 17, wherein modeling covariance comprises imposing a cardinality budget constraint on a variable $d_{ij}$ representing a relationship between error at the first location (i) and the second location (j).

20. The non-transitory computer readable medium of claim 19, wherein modeling covariance further comprises narrowing a boundary of a range of the variable $d_{ij}$ according to Jensen's Inequality.

* * * * *